(12) United States Patent
Timan et al.

(10) Patent No.: US 10,411,576 B2
(45) Date of Patent: Sep. 10, 2019

(54) LIQUID COOLED LINEAR INDUCTION MOTOR

(71) Applicant: Bombardier Transportation GmbH, Berlin (DE)

(72) Inventors: Peter Edward Timan, Sydenham (CA); Evan Chou, Toronto (CA)

(73) Assignee: Bombardier Transportation GmbH, Berlin (DE)

( * ) Notice: Subject to any disclaimer, the term of this patent is extended or adjusted under 35 U.S.C. 154(b) by 274 days.

(21) Appl. No.: 15/609,714

(22) Filed: May 31, 2017

(65) Prior Publication Data

US 2018/0062493 A1     Mar. 1, 2018

(30) Foreign Application Priority Data

Aug. 30, 2016   (CA) ..................................... 2940735

(51) Int. Cl.
*H02K 1/20* (2006.01)
*H02K 41/025* (2006.01)
*H02K 41/02* (2006.01)
*H02K 9/19* (2006.01)
*H02K 15/02* (2006.01)

(52) U.S. Cl.
CPC .............. *H02K 41/025* (2013.01); *H02K 1/20* (2013.01); *H02K 9/19* (2013.01); *H02K 15/02* (2013.01); *H02K 41/02* (2013.01)

(58) Field of Classification Search
CPC ......... H02K 9/00–9/28; H02K 41/02–41/0358
See application file for complete search history.

(56) References Cited

U.S. PATENT DOCUMENTS

| | | |
|---|---|---|
| 3,453,460 A | 7/1969 | Butler et al. |
| 3,835,339 A | 9/1974 | Laronze |
| 4,749,921 A * | 6/1988 | Chitayat ............. H02K 41/031 310/12.24 |
| 5,128,569 A | 7/1992 | Gladish |
| 5,191,246 A | 3/1993 | Roxborough |

(Continued)

FOREIGN PATENT DOCUMENTS

| | | | |
|---|---|---|---|
| DE | 102014220148 A1 * | 4/2016 | ............. H02K 41/02 |
| EP | 0567500 B1 | 9/1995 | |

(Continued)

OTHER PUBLICATIONS

US 5,122,701 A, 06/1992, Vollenwyder et al. (withdrawn)

*Primary Examiner* — Ramon M Barrera
(74) *Attorney, Agent, or Firm* — The Webb Law Firm

(57) ABSTRACT

A primary for a linear induction motor having a core, electrical winding coils and a cooling system. The core extends longitudinally and has slots extending laterally in a first face thereof. Electrical winding coils inserted in the slots have end turns that extend laterally beyond each side of the core. The electrical winding coils are aligned sequentially along a length of the core. The cooling system, which is adapted to receive a cooling fluid, includes a serpentine tubing assembly and two lateral tubes. The serpentine tubing assembly is at least partially in contact with the core so as to transfer heat from the core to the environment. Each one of the two lateral tubes extend longitudinally along a different side of the core and within a respective longitudinal alignment of the end turns of the electrical winding coils.

18 Claims, 10 Drawing Sheets

(56) References Cited

U.S. PATENT DOCUMENTS

2014/0054979 A1* 2/2014 Sugita .................. H02K 9/20
310/12.29
2014/0312718 A1* 10/2014 Li .................. H02K 41/0356
310/12.29

FOREIGN PATENT DOCUMENTS

| JP | 63213464 A | 9/1988 | |
|----|------------|--------|---|
| JP | 63228903 A | 9/1988 | |
| JP | 10285902 A | 10/1998 | |
| KR | 100261814 B1 | 7/2000 | |
| WO | WO-2012004858 A1 * | 1/2012 | ............. H02K 1/148 |

* cited by examiner

LIQUID COOLED LINEAR INDUCTION MOTOR

CROSS-REFERENCE TO RELATED APPLICATION

This application claims priority to Canadian Patent Application No. 2,940,735 filed Aug. 30, 2016, the disclosure of which is hereby incorporated in its entirety by reference.

FIELD OF THE INVENTION

The present invention generally relates to the field of linear induction motors. More specifically, the invention relates to a primary for a linear induction motor having an improved liquid cooling system.

BACKGROUND OF THE INVENTION

The concept of the linear induction motor (LIM) dates back to over a century ago. Yet, these motors can still benefit from having their efficiency, and consequently their performance, improved.

One limitation to their efficiency has to do with the relatively high temperatures reached by motor windings when the motor is under load. Indeed, as electrical resistance in the copper windings increases with temperature, energy losses consequently increase, reducing the thrust performance of the motor.

Moreover, high working temperature adversely affect the life expectancy of LIM winding insulation, leading directly to reduced reliability of the LIM motor. As a rule of thumb, each decrease of the LIM motor windings by 10° C. (18° F.) doubles the insulation life.

There is therefore a clear need, and many benefits, to decreasing the working temperature of LIM motors.

SUMMARY OF THE INVENTION

It is an object of the present invention to provide a liquid-cooled linear induction motor that overcomes or mitigates one or more disadvantages of known air and liquid-cooled linear induction motors, or at least provides a useful alternative.

The invention provides the advantages of increasing the LIM motor efficiency by decreasing the temperature of the motor's electrical winding coils.

Moreover, the liquid cooled configuration provides the advantage of better isolating the LIM motor from the environment, thereby permitting a more reliable operation in potentially inhospitable environments having extreme conditions of temperature, humidity, sand and dust.

In accordance with an embodiment of the present invention, there is provided a primary for a linear induction motor comprising a core, electrical winding coils and a cooling system. The core extends longitudinally and has slots extending laterally in a first face thereof. The electrical winding coils are inserted in the slots and have end turns that extend laterally beyond each sides of the core. The electrical winding coils are aligned sequentially along a length of the core. The cooling system, which is adapted to receive a cooling fluid, comprises a serpentine tubing assembly and two lateral tubes all connected together. The serpentine tubing assembly is at least partially in contact with the core so as to transfer heat from the core to the environment. Each one of the two lateral tubes extend longitudinally along a different side of the core and within a respective longitudinal alignment of the end turns of the electrical winding coils. The two lateral tubes have an oblong or ovoid cross-section that, at least partially, conforms to an inside surface of the end turns so that the two lateral tubes are in thermal conduction contact with their respective alignment of the end turns. The two lateral tubes may be vacuum impregnated with their respective longitudinal alignment of the end turns. The serpentine tubing assembly may also be vacuum impregnated with the core.

Optionally, the cross-section may have an exterior profile having a first semi-circular extremity with a first radius and an opposed second semi-circular extremity with a second radius, where the first radius is larger than the second radius. The first semi-circular extremity and the second semi-circular extremity may be connected by two substantially straight lines. Alternatively, the cross-section may have only the first semi-circular extremity while the opposed extremity may comprise a straight line. Another option is to have the cross-section substantially approach the shape of a teardrop.

The serpentine tubing assembly is placed in thermal contact with the core in proximity to a second face which is opposed the first face. An electrical insulation, such as a fiberglass sock, may be used between the serpentine tubing assembly and the core to prevent electrical conduction between the two components while still allowing thermal conduction. The fiberglass sock is placed over at least a portion of the serpentine tubing assembly which is in contact with the core. This fiberglass sock may be impregnated with resin during a vacuum impregnation process.

The cooling system may further comprise an inlet connected to an inlet manifold and an outlet connected to an outlet manifold. The serpentine tubing assembly has one first serpentine tube and one second serpentine tube where the first serpentine tube is connected to the inlet manifold at or proximate a first extremity of the core and to the outlet manifold at or proximate a second extremity of the core. The second serpentine tube is connected to the inlet manifold at or proximate the second extremity of the core and is connected to the outlet manifold at or proximate the first extremity of the core. The outlet manifold is connected to the two lateral tubes at one extremity of the two lateral tubes. At their opposite extremity, the two lateral tubes are connected to the outlet.

Alternatively, the cooling system may further comprise an inlet connected to an inlet manifold and an outlet connected to an outlet manifold and a serpentine tubing assembly having two first serpentine tubes and two second serpentine tubes. Each one of the two first serpentine tubes extend from a longitudinal mid-portion of the core to an extremity of the core, which extremity is different for each of the two first serpentine tubes. Each one of the two first serpentine tubes is connected to the inlet manifold proximate the longitudinal mid-portion of the core and to the outlet manifold proximate its different extremity of the core. Each one of the two second serpentine tubes is connected to the inlet manifold proximate one different extremity of the core, extend towards the mid-portion of the core, and is connected to the outlet manifold proximate the mid-portion of the core. The outlet manifold is connected to the two lateral tubes at one of their extremities. At the other extremity, each one of the two lateral tubes is connected to the outlet.

Preferably, the core is made of a plurality of longitudinally extending laterally adjacent, similar, thin ferromagnetic laminations. The electrical winding coils are typically electrically connected together in coil sets, where the coil sets are themselves connected with every other third coil set.

In accordance with another embodiment of the present invention, there is provided a method of making a primary for a linear induction motor. The method comprises:

assembling into a core a plurality of elongated, similar, thin ferromagnetic laminations by laterally placing them in contact adjacent to each other, where each lamination includes a plurality of slots which are placed along one longitudinal edge thereof;

inserting electrical winding coils in the slots with end turns extending laterally beyond each sides of the core, thereby creating one longitudinal alignment of end turns on both a left and a right side of the core;

at least partially inserting a serpentine tubing assembly in the core in proximity to a surface which is opposite a face coplanar to the longitudinal edges of the laminations; and inserting one lateral tube within each one of the two longitudinal alignments of end turns so that the lateral tubes contact an inner surface of said end turns, the two lateral tubes preferably having an oblong or ovoid external cross-section.

Optionally, the two lateral tubes and their respective longitudinal alignment of end turns may be vacuum impregnated, using pressure or not.

Preferably, the method may further comprise retaining at least partially the serpentine tubing assembly in contact with the core using a plurality of wedges.

Advantageously, the method may further comprises inserting an electrical insulation layer, such as a fiberglass sheet or sock, between the serpentine tubing assembly and the core and covering at least the portion of the serpentine tubing assembly which is inserted in the slots. This allows to electrically insulate the serpentine tubing assembly from the core. Optionally, the sock may be vacuum impregnated with resin.

BRIEF DESCRIPTION OF DRAWINGS

These and other features of the present invention will become more apparent from the following description in which reference is made to the appended drawings wherein:

FIG. 8b is a partial bottom view of the primary of FIG. 8a;

DETAILED DESCRIPTION OF THE INVENTION

The present invention relates to a primary for a liquid cooled linear induction motor as sometimes used in propulsion systems of rail vehicles. The liquid cooled primary described increases the motor efficiency by decreasing the temperature of its electrical winding coils. It also permits a substantial isolation of the LIM motor from its environment, thereby permitting a more reliable operation in potentially inhospitable conditions of temperature, humidity, sand, dust, etc.

Figure 1:
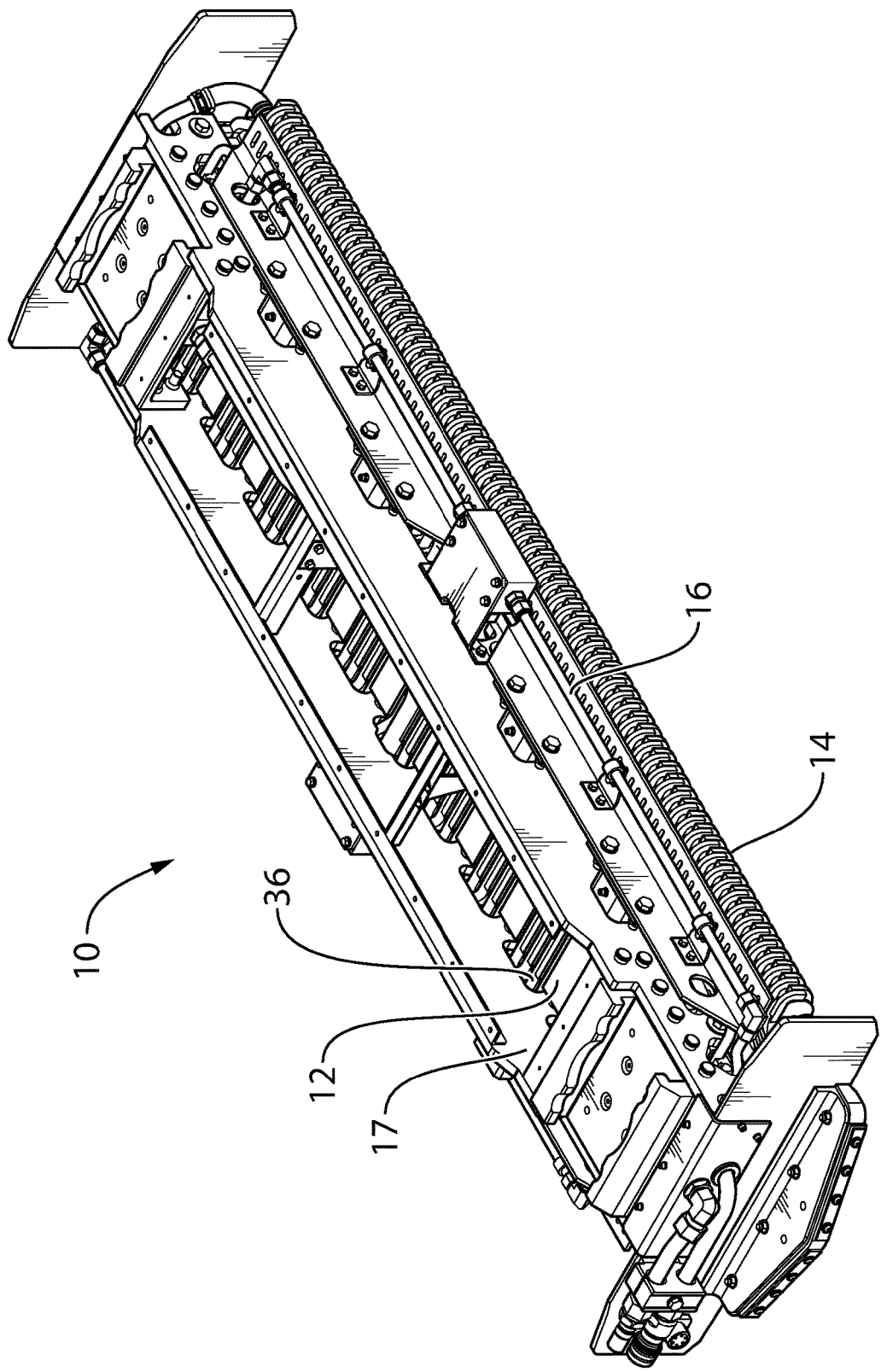
FIG. 1 is a perspective view of a primary of a linear induction motor in accordance with an embodiment of the present invention.

FIG. 1 is now referred to. A linear induction motor comprises two components: a primary 10, which is intended to be in movement during use, and a secondary, also known as a reaction rail (not shown), which is intended to be static and therefore usually attached to a fixed element such as a guideway. The primary 10 comprises a core 12, electrical winding coils 14, a cooling system 16 and a chassis 17.

Figure 2:
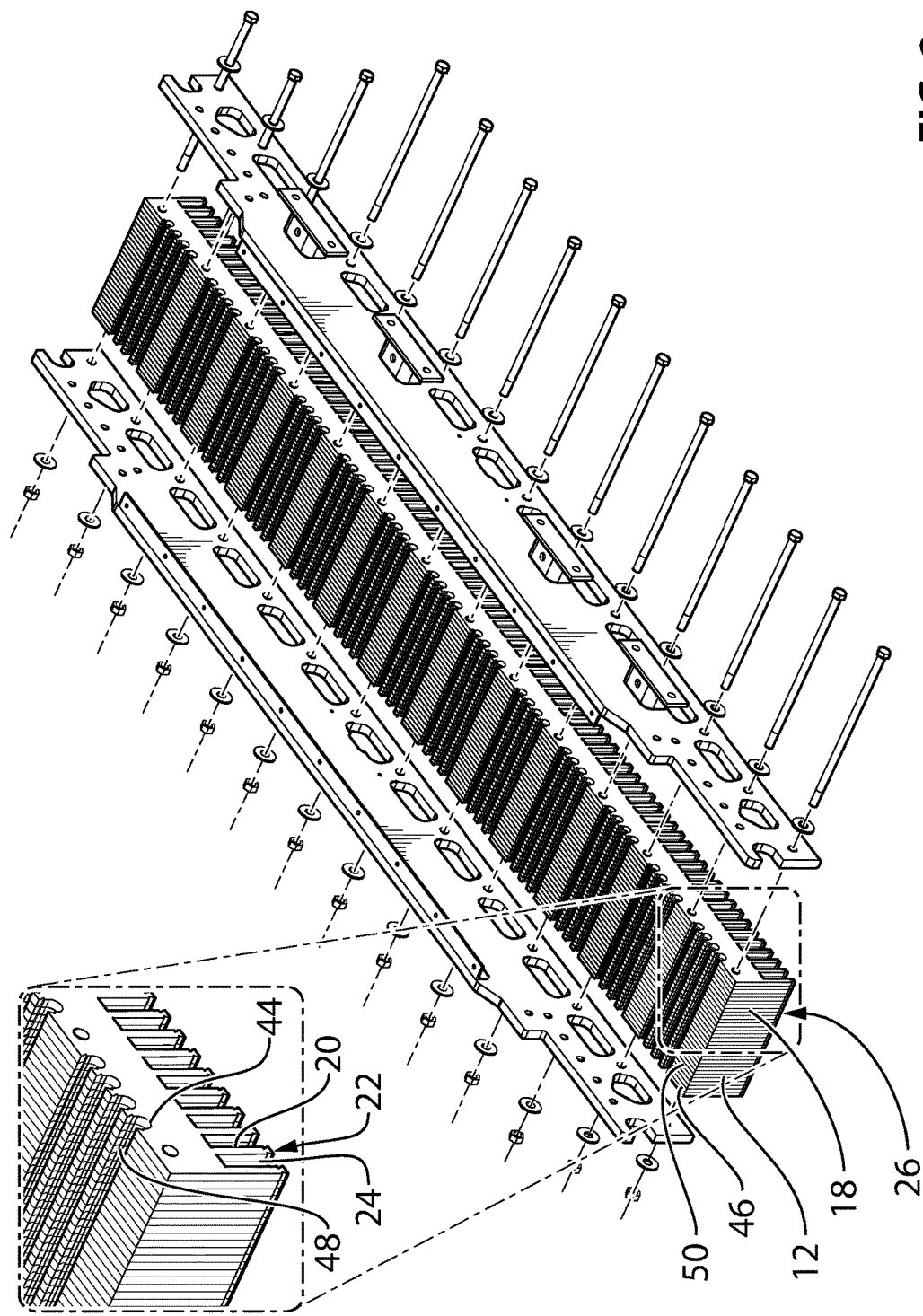
FIG. 2 is a partial exploded perspective view of a subassembly of the primary of FIG. 1.

As shown in FIG. 2, now concurrently referred to, the core 12 has an elongated shape which is typically made of a plurality of adjacent laminations 18 assembled together by bolts 19. Each lamination 18 is cut out of a sheet of ferromagnetic material and has a series of elongated cuts 20 along a front edge 22. Once assembled together, the laminations 18 create the core 12 and each elongated cut 20 creates a laterally extending slot 24 in a front face 26. The terms "front" and "back" refer to a working orientation of the linear induction motor where the "front" of the primary 10 faces the static reaction rail.

Figure 3:
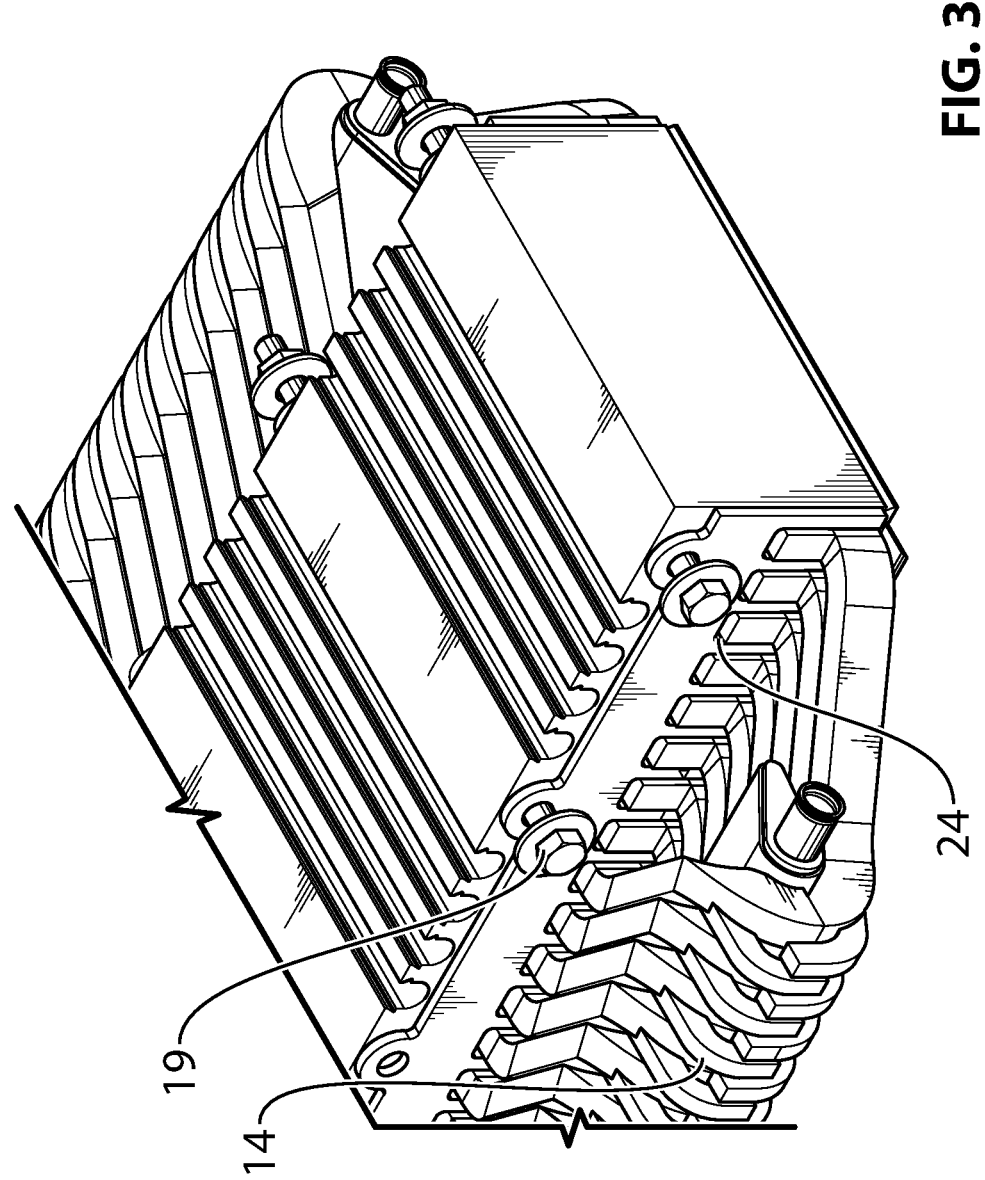
FIG. 3 is a partial isometric view of the primary of FIG. 1.
Figure 4:
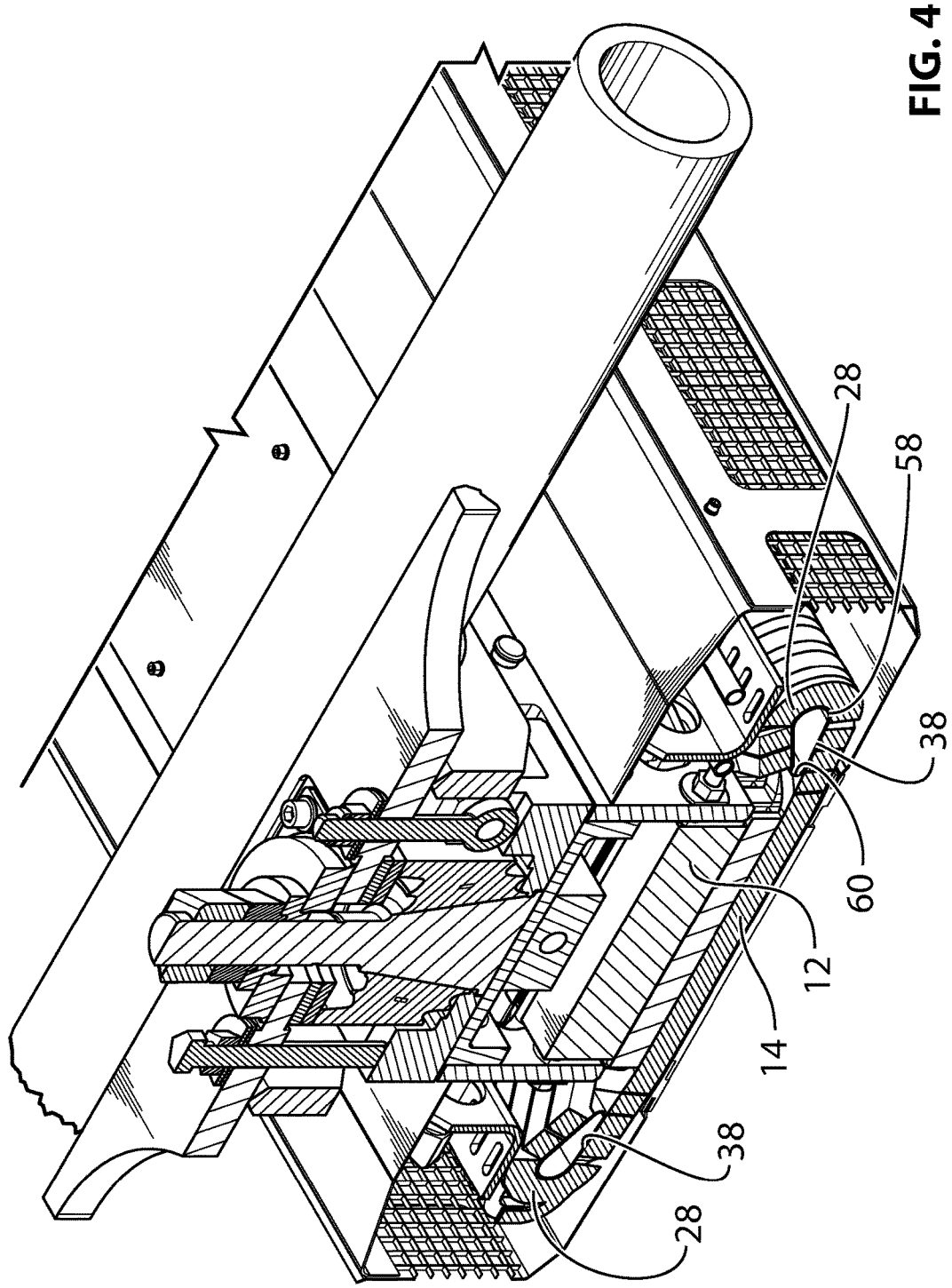
FIG. 4 is a cross-sectional front view of the primary of FIG. 1.

FIG. 3 and FIG. 4 are now concurrently referred to. The electrical winding coils 14, which are inserted in the transversal slots 24, have end turns 28 that extend laterally beyond each sides of the core 12. Although different primaries may use different quantities of electrical winding coils 14, the primary 10 of the present example uses 72 electrical winding coils 14. Since the electrical winding coils 14 are all sequentially aligned along a length of the core 12, so are the end turns 28 on each side of the core 12. Each electrical winding coil 14 is typically made of many turns of copper wire. As an example, each electrical winding coil 14 may be made of 4 turns of 4 strands of copper wire having a rectangular cross-section. The electrical winding coils 14 are electrically connected together in groups of 4 coil sets to form a single phase of a single pole which is further connected at every third coil set of electrical winding coils 14. There are three phases per pole connected in series to form six poles. There is therefore a total of 72 electrical winding coils 14 extending along the core 12. The person skilled in the art will recognize that many different arrangement of electrical winding coils 14 may be used, depending on specific applications and that the example provided shall not be considered as limiting. As is usual, each electrical winding coil 14 is wrapped in an insulating tape. Typically, once installed in the slots 24, the electrical winding coils 14 are then vacuum impregnated with a resin such as epoxy. However, as will be described later, it may be preferable to wait until the cooling system 16 is at least partially installed to proceed with the vacuum impregnation.

Figure 5:
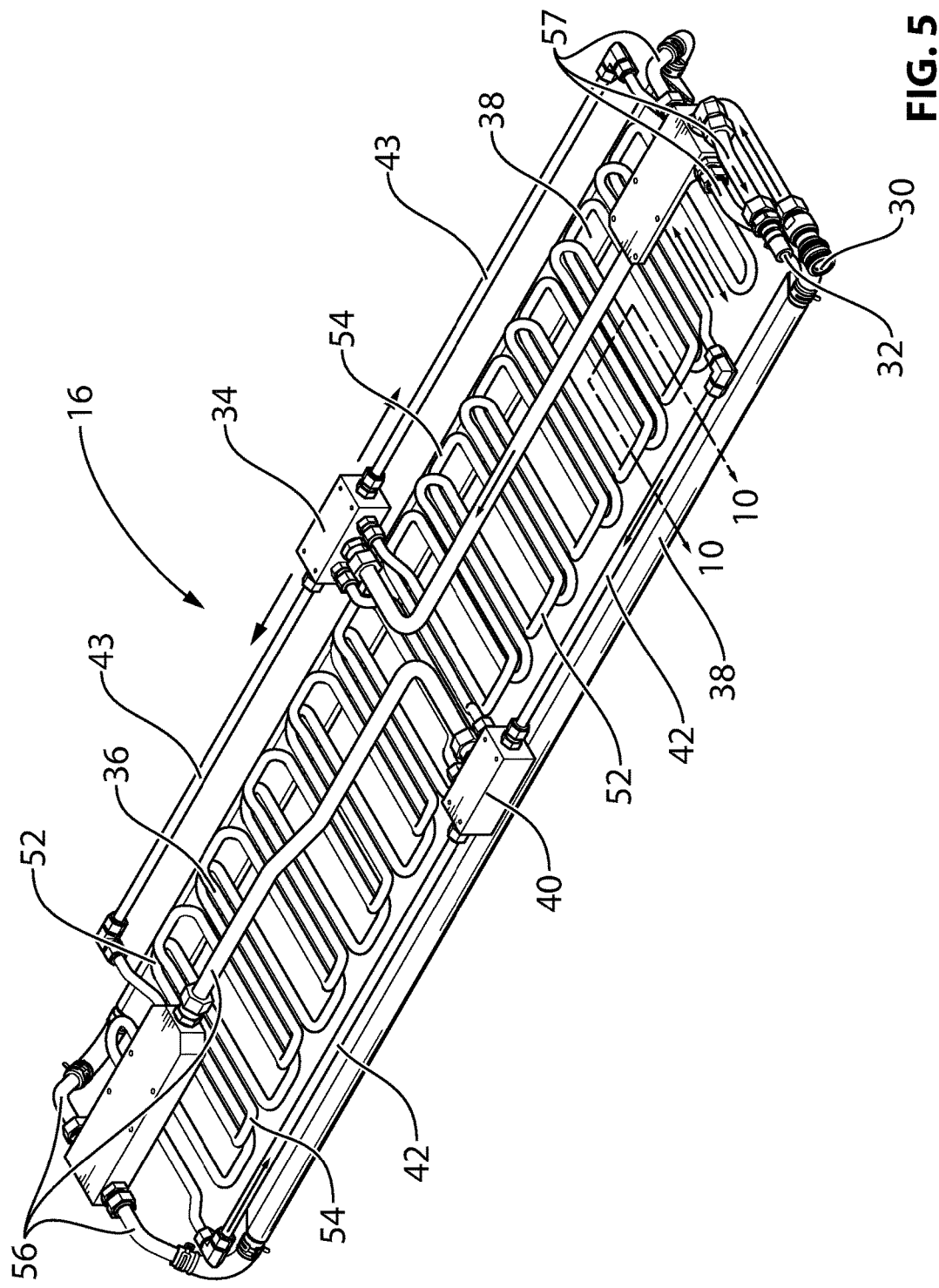
FIG. 5 is a perspective view of a cooling system of the primary of FIG. 1.

FIG. 5, now concurrently referred to, shows the details of the cooling system 16 in isolation. The cooling system 16 has an inlet 30 for receiving a cooled cooling fluid (typically a liquid which is a mix of water and glycol) and an outlet 32 for returning the warm cooling fluid to a heat exchanger (not shown). The cooling system 16 also comprises an inlet manifold 34 connected to the inlet 30, a serpentine tubing assembly 36, two lateral tubes 38 and an outlet manifold 40 connected to the outlet 32. These components are interconnected by a network of conduits 42, 43, 56 and 57. The serpentine tubing assembly 36 shall be defined as the portion of the tubing assembly that serpentines within the core 12.

Figure 10:
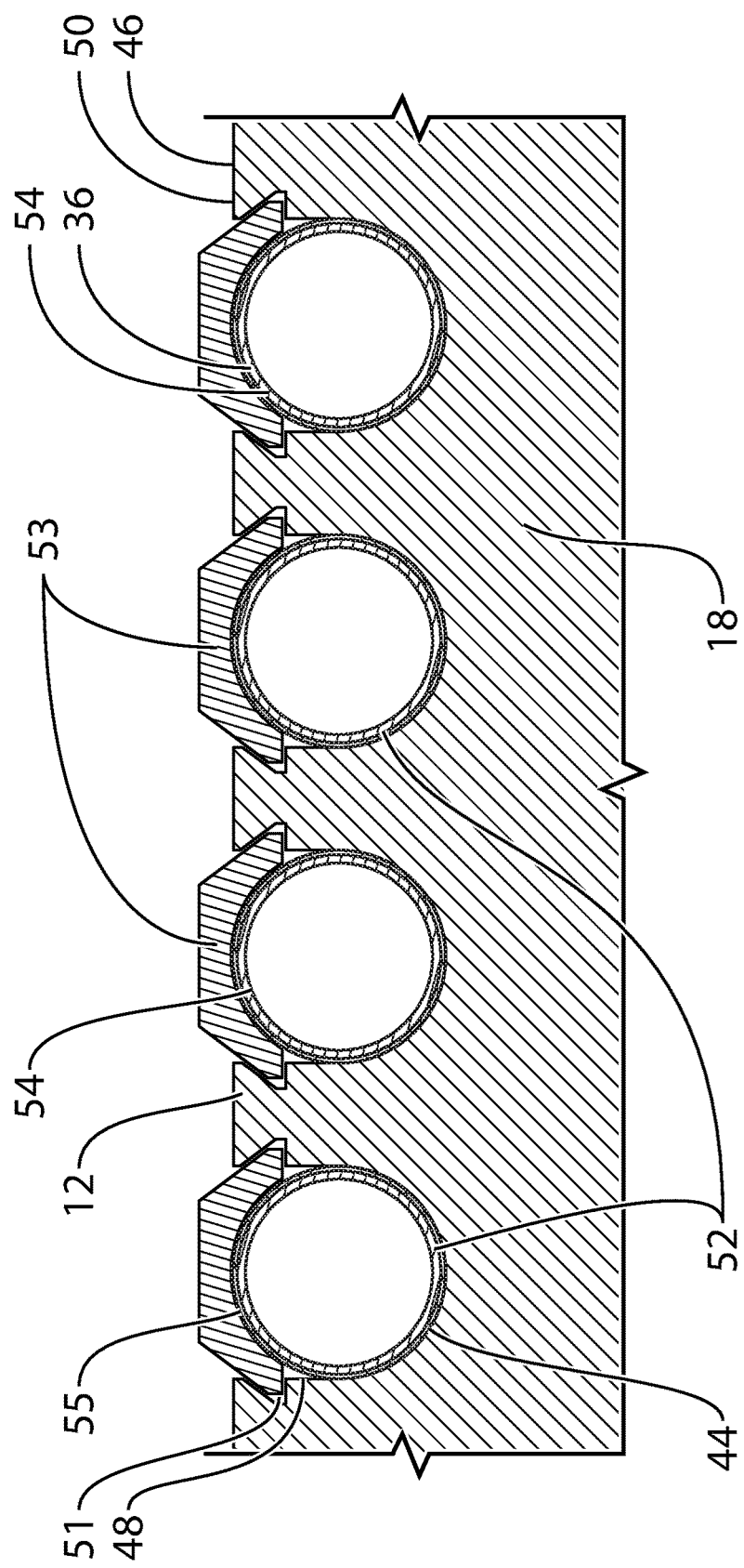
FIG. 10 is a partial cross section view of a core and the cooling system of the primary of FIG. 1.

Although, it may seem that the most beneficial place to install the serpentine tubing assembly 36 would be within the core 12, adjacent to the electrical winding coils 14, this placement may not be the most recommended as the primary's magnetic performance could be negatively affected. As best shown in FIGS. 2 and 10, now concurrently referred to, cuts 44 having a semi-circular bottom are made along a back edge 46 of each lamination 18 so as to form channels 48 into a back face 50 of the core 12, once the laminations 18 are assembled into the core 12. As best shown in FIGS. 1 and 10, these channels 48 accommodate the serpentine tubing assembly 36 which may then transfer heat away from the core 12 by thermal conduction through the portion of serpentine tubing assembly 36 inserted in the core 12. An electrical insulation 55, such as a fiberglass sock, may be used between the serpentine tubing assembly 36 and the core 12 to prevent electrical conduction between these two components while still allowing thermal conduction to take place. The electrical insulation 55 is placed so as to cover at least the semi-circular bottom of the slots 24 where the serpentine tubing assembly 36 contacts the core 12. The electrical insulation 55 may be impregnated with resin through a vacuum impregnation process.

The walls of the channels 48 are provided with notches 51. These notches 51 are used to capture a wedge 53 which presses the first and second serpentine tubes 52, 54 in contact with the surface of the core 12, and more particularly with the bottom of the slots 24, thereby improving conductivity between both.

Returning to FIG. 5, it may be observed that the serpentine tubing assembly 36 is made of four serpentine tubes of two different kind: two first serpentine tubes 52 and two second serpentine tubes 54. Each one of the two first serpentine tubes 52 is connected at one end to the inlet manifold 34, which is located approximately at mid distance along a length of the core 12. Each one of the two first serpentine tubes 52 extend towards a different extremity of the core 12, where they are each connected to the outlet manifold 40 through conduits 42. Each one of the two second serpentine tubes 54 is connected to the inlet manifold, through conduits 43, at a different extremity of the core 12 and extend towards the mid portion of the core 12 where they connect to the outlet manifold 40. The outlet manifold 40, through conduits 56 located at one end of the core 12, is connected to the two lateral tubes 38 at one of their extremities. At their opposite extremity, the two lateral tubes 38 are connected to the outlet 32 through conduits 57. This cooling circuit arrangement creates two crossflows, one on each half of the core 12, before cooling the end turns 28. This crossflow ensures a substantially symmetrical and even temperature of the core 12.

Figure 6:
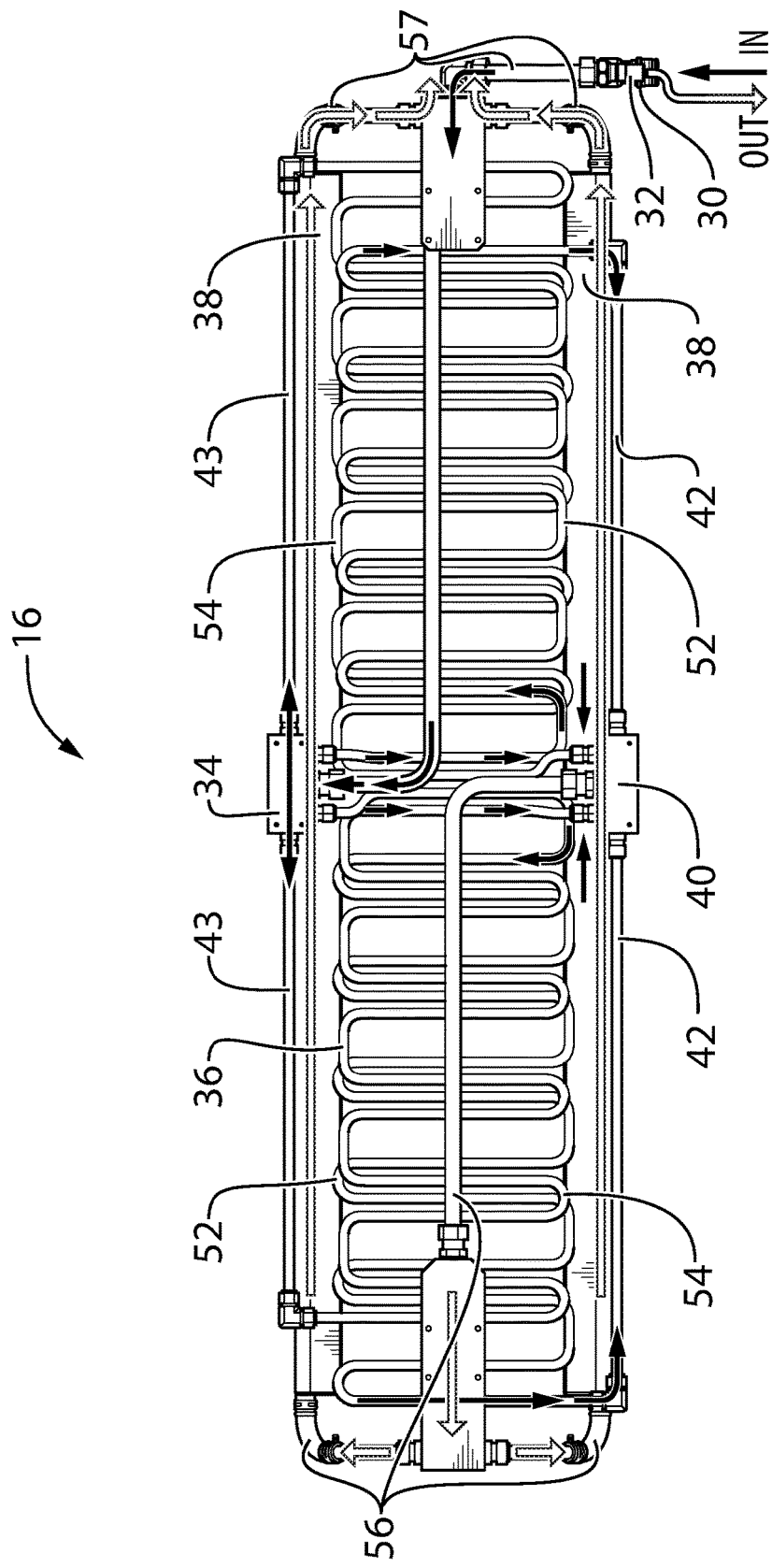
FIG. 6 is a top view of the cooling system of FIG. 5 showing a flow of cooling fluid.

FIG. 6, now concurrently referred to, shows the flow followed by the cooling fluid. As shown by the solid arrows, the cooling fluid enters the inlet 30 and flows to the inlet manifold 34 where the flow is split in four: it is directed at the same time to both first serpentine tubes 52 and to both second serpentine tubes 54. The flows of cooling fluid in the first serpentine tubes 52 start cooling the core 12 from its mid-portion and gradually pick up heat from the core 12 as they flow towards the extremities of the core 12. Conversely, the flows of cooling fluid in the second serpentine tubes 54 start cooling the core 12 from its extremities and pick up heat as they flow towards the mid-portion of the core 12. This counter-flow design substantially evens out a potential gradient of temperature in the core 12 which would otherwise exist as a consequence of the cooling fluid gradually increasing in temperature as it picks up heat. The four flows exiting each of the two first serpentine tubes 52 and the two second serpentine tubes 54 are then collected in the outlet manifold 40 and channeled towards both lateral tubes 38, where the flow enters at one end of the lateral tubes and circulates towards their second extremity, further picking up heat from the end turns 28 of the electrical winding coils 14 in the process. Finally, the cooling fluid exits the cooling system 16 at the outlet 32 to be cooled at a heat exchanger (not shown), such as a radiator, conveniently placed to dissipate the heat contained in the cooling fluid. Since the system works in a closed loop, the flow of cooling fluid is routed to the inlet 30 from the heat exchanger.

Figure 7:
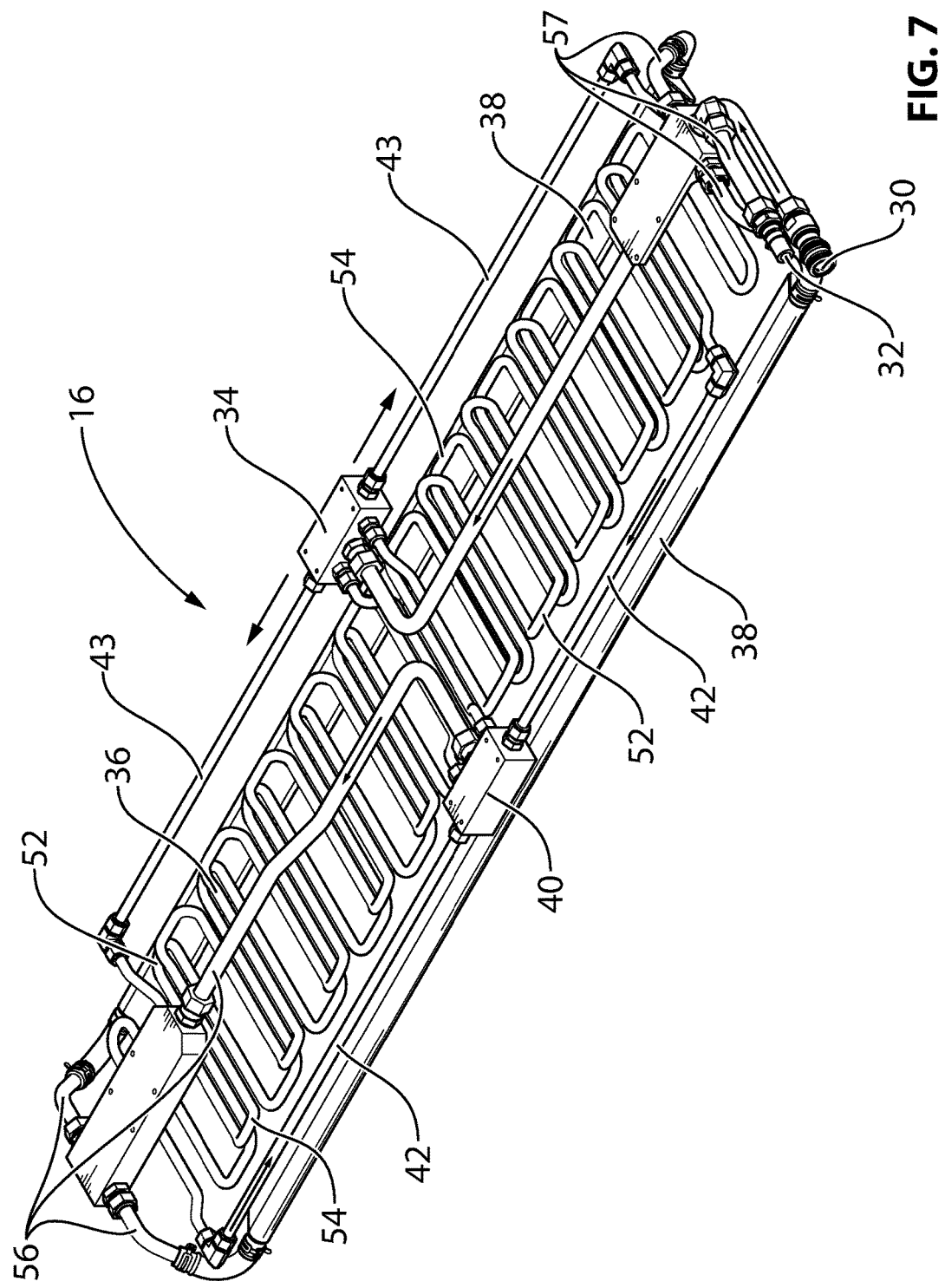
FIG. 7 is a perspective view of an alternative cooling system in accordance with another embodiment of the present invention.

Alternatively, the serpentine tubing assembly 36 could use only one first serpentine tube 52 and only one second serpentine tube 54, while still being designed to have the cooling fluid circulate in a counter-flow manner. This alternative design is depicted in FIG. 7, now concurrently referred to. In this case, the first serpentine tube 52 is connected to the inlet manifold 34 proximate a first extremity of the core 12 and to the outlet manifold 40 proximate a second extremity of the core 12. The second serpentine tube 54 is connected to the inlet manifold 34 proximate the second extremity of the core 12 and is connected to the outlet manifold 40 proximate the first extremity of the core 12. The outlet manifold 40 is connected to the two lateral tubes 38 at one of their extremity. At their opposite extremity, the two lateral tubes 38 are connected to the outlet 32.

As can be seen, different design for the serpentine tubing assembly 36 may be envisioned. In every case, it is advantageous to have at least two flows of cooling fluid circulate in a counter-flow manner.

Reverting to FIG. 4, each one of the two lateral tubes 38 extend longitudinally along a different side of the core 12 and within a respective longitudinal alignment of the end turns 28 of the electrical winding coils 14. The two lateral tubes 38 are designed to match as much as possible the shape of an inside surface of the end turns 28. Hence, the lateral tubes 38 have an elongated, oblong cross-section which at least partially (i.e. as much as practically possible) conforms to the inside surface of the end turns 28 so as to be in thermal conduction contact with their respective alignment of end turns 28. As can be seen, the cross-section of the lateral tubes 38 has an exterior profile which has a first semi-circular extremity 58 with a larger radius than an opposed second semi-circular extremity 60. Both extremities are connected by straight lines. The exact shape of the cross-section of the lateral tubes 38 depends on the shape of the end turns 28. It could take, for example, an ovoid or teardrop shape or any other convenient shape that maximizes the contact between the lateral tubes 38 and the inside surface of the end turns 28. The cross-section shape could also be truncated at its smaller end (the end closer to the core 12). From a practical standpoint however, it may be possible that the lateral tubes 38 do not completely match the interior surface of the end turns 28, for example, if the cross-section of the lateral tubes would have to have a sharp edge which may not be convenient. Nevertheless, by creating this oblong shape, the lateral tubes 38 have a large percentage of their exterior surface in contact with the end turns 28, in fact larger than if the lateral tubes 38 would have a round cross-section.

In order to further enhance the thermal exchange between them, each lateral tube 38 may be vacuum impregnated to its respective longitudinal alignment of end turns 28. This may conveniently be done at the same time the electrical winding coils 14 are vacuum impregnated with the core 12.

Both thermal and magnetic simulations were performed in order to define and optimize the cooling system 16 by ensuring that the primary 10 preserves its magnetic behavior while preventing its temperature from exceeding the maximum rated temperature of insulating materials used in the construction of the primary 10. Although different classes of insulating material may be adequately used, it has been found that NEMA Class H insulating materials, which are rated to withstand temperatures up to a ΔT of 180° C. (324° F.) at an ambient temperature of 40° C. (104° F.), perform adequately. This ΔT rating is therefore the equivalent of a working temperature of 220° C. (428° F.). Although they can withstand even higher temperatures for short durations, a maximum ΔT of 150° C. (270° F.) is targeted to ensure an acceptably long service life of the insulating material.

Figure 8A:
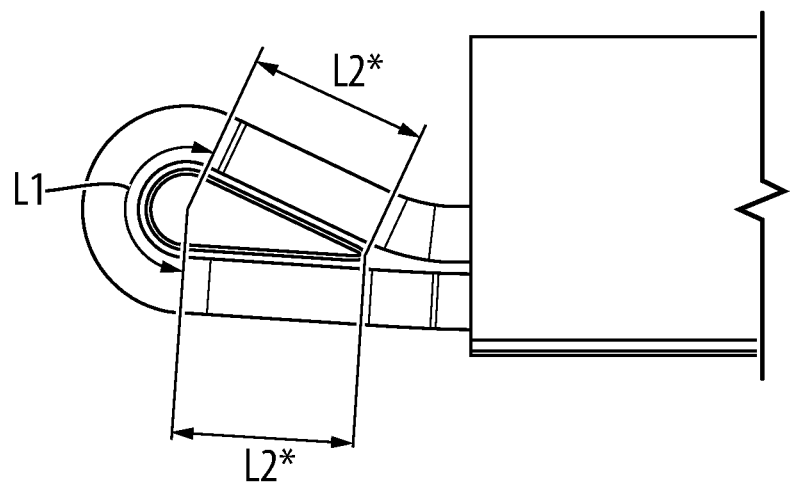
FIG. 8a is a partial front view of the primary of FIG. 1 showing a close-up of an end turn of an electrical winding coil and of an associated lateral tube.
Figure 8B:
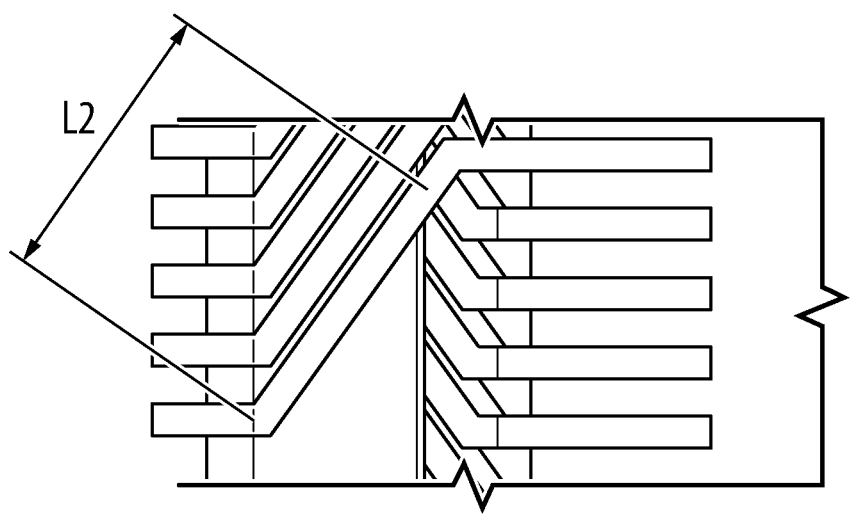

In performing the thermal simulations, an ambient temperature of 20° C. (68° F.) was assumed. The sensitivity of the temperature of one electrical winding coil 14 was investigated by varying a contact length of the lateral tube 38 with the inside surface of the end turn 28. The contact length is depicted in FIGS. 8a and 8b, now concurrently referred to, and corresponds to L1+2(L2). Note that the length L2 is the length of electrical winding coil 14 in contact with the lateral tube 38 as shown in FIG. 8b, and not its projection L2* as seen in FIG. 8a. Also note that the length L2, as for the length L1, is the length of an arc and not the length between two end points (unless the contact length is a straight line). Hence, should the exact shape of the inside of the end turn 28 be somewhat different, for example, if the shape was more ovoid and the segments corresponding to the lengths L2 would be arcs rather than straight lines, then the length L2 would be the length of this arc and not the length between the end points of the arc.

Figure 9:
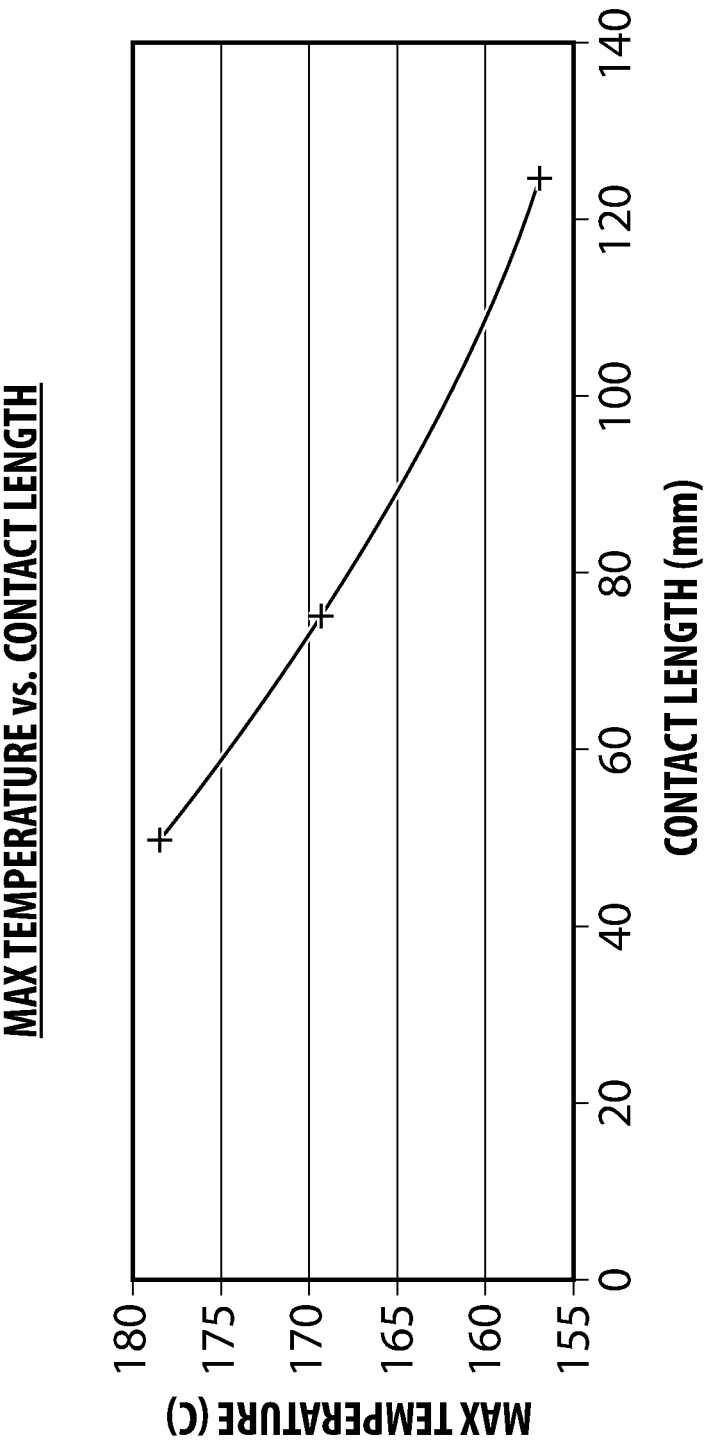
FIG. 9 is a graph showing a relation between operating temperature of the electrical winding coil of the primary of FIG. 1 as a function of its contact surface with an associated lateral tube.

The same model was run with contact lengths varying from 50 mm to 125 mm, simulating lateral tubes of different cross-sections. FIG. 9, now concurrently referred to, depicts the results of such simulations. As can be seen, the maximum targeted temperature of 170° C. (338° F.) is reached when the contact length is down to approximately 72 mm. Any longer contact length ensures that the rated maximum temperature of the insulating material will not be exceeded.

The primary 10 is assembled according to the following manufacturing method. Firstly, the plurality of similar, thin ferromagnetic laminations 18 are assembled into the core 12 by laterally placing them adjacent to each other and by holding them together by bolts 19. All the elongated cuts 20 and the semi-circular cuts 44 are aligned to respectively create the slots 24 and the channels 48. Secondly, the electrical winding coils 14 are inserted in the slots 24 with the end turns 28 extending laterally beyond each sides of the core 12, thereby creating one longitudinal alignment of end turns 28 for each of the left and the right sides of the core 12. The electrical winding coils 14 are then electrically connected together in groups of 4 coil sets to form a single phase of a single pole which is further connected at every third coil set of electrical winding coils 14. There are three phases per pole connected in series to form six poles. Again, this specific assembly of electrical winding coils 14 is only provided as an example and different applications may require a different electrical connection scheme of the electrical winding coils 14. Then, the cooling system 16 starts being assembled: the serpentine tubing assembly 36 is inserted in the channels 48 of the core 12 proximate the back face 50. One lateral tube 38 is inserted within each one of the two longitudinal alignments of end turns 28 so that the lateral tubes are placed in contact with the inner surface of the end turns 28. The lateral tubes 38 are connected to the serpentine tubing assembly 36. Finally, the two lateral tubes 38 may be vacuum impregnated with resin with their respective longitudinal alignment of end turns 28. Similarly, the electrical winding coils 14 are also vacuum impregnated with the core 12.

Throughout the present description, the process of vacuum impregnation has been cited. This generic process is intended to include its variants such as dry vacuum impregnation process, wet vacuum impregnation process and vacuum pressure impregnation process. Various considerations, which should be known to the person skilled in the art, may dictate the specific use of one or the other of these processes.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A primary for a linear induction motor comprising:
a core, said core extending longitudinally, said core having laterally extending slots in a first face thereof;
electrical winding coils, said electrical winding coils being inserted in said slots and having curved end turns extending laterally beyond each side of said core, said electrical winding coils being aligned sequentially along a length of said core, thereby creating one alignment of curved end turns on each side of said core;
a cooling system, said cooling system being adapted to receive a cooling fluid, said cooling system having:
a serpentine tubing assembly, said serpentine tubing assembly being at least partially in contact with said core; and
two lateral tubes, each one of said two lateral tubes extending longitudinally along a different side of said core and within a respective longitudinal alignment of said curved end turns of said electrical winding coils, said two lateral tubes having an oblong cross-section at least partially conforming to an inside surface of said curved end turns, said two lateral tubes being in thermal conduction contact with their respective alignment of curved end turns, said serpentine tubing assembly and said two lateral tubes being connected together to form said cooling system.

2. The primary of claim 1 wherein said oblong cross-section has an exterior profile having a first semi-circular extremity with a first radius and an opposed second semi-circular extremity with a second radius, said first radius being larger than said second radius.

3. The primary of claim 2 wherein said first semi-circular extremity and said second semi-circular extremity are connected by two substantially straight lines.

4. The primary of claim 1 wherein said oblong cross-section has an exterior profile having a substantially teardrop shape.

5. The primary of claim 2 wherein said serpentine tubing assembly is placed in thermal contact with said core proximate a second face of said core opposed said first face of said core.

6. The primary of claim 5 wherein said two lateral tubes are vacuum impregnated with their respective alignment of curved end turns.

7. The primary of claim 5 wherein said cooling system further comprises an inlet connected to an inlet manifold, an outlet and an outlet manifold, said serpentine tubing assembly having one first serpentine tube and one second serpentine tube, said first serpentine tube being connected to said inlet manifold proximate a first extremity of said core and to said outlet manifold proximate a second extremity of said core, said second serpentine tube being connected to said inlet manifold proximate said second extremity of said core and being connected to said outlet manifold proximate said first extremity of said core, said outlet manifold being connected to said two lateral tubes at one extremity of said two lateral tubes, said two lateral tubes being connected to said outlet at their opposite extremity.

8. The primary of claim 5 wherein said cooling system further comprises an inlet connected to an inlet manifold, an outlet and an outlet manifold, said serpentine tubing assembly having two first serpentine tubes and two second serpentine tubes, each one of said two first serpentine tubes being connected to said inlet manifold proximate a longitudinal mid-portion of said core and to said outlet manifold proximate one different extremity of said core, each one of said two second serpentine tubes being connected to said inlet manifold proximate one different extremity of said core and being connected to said outlet manifold proximate said mid-portion, said outlet manifold being connected to said two lateral tubes at one extremity of said two lateral tubes, said two lateral tubes being connected to said outlet at their opposite extremity.

9. The primary of claim 5 further comprising an electrical insulation between said serpentine tubing assembly and said core.

10. The primary of claim 9 wherein said electrical insulation is a fiberglass sock placed over at least a portion of said serpentine tubing assembly, said fiberglass sock being placed so as to contact said core.

11. The primary of claim 10 wherein said fiberglass sock is impregnated with resin.

12. The primary of claim 1 wherein said core is made of a plurality of longitudinally extending laterally adjacent, similar, thin ferromagnetic laminations.

13. The primary of claim 12 wherein said electrical winding coils are electrically connected together in coil sets, said coil sets being further connected with every third coil set.

14. A method of making a primary for a linear induction motor, said method comprising:
    assembling into a core a plurality of elongated, thin ferromagnetic laminations by laterally placing them adjacent to each other, each lamination including a plurality of slots, said plurality of slots being disposed along a longitudinal edge thereof;
    inserting electrical winding coils in said slots with curved end turns extending laterally beyond each sides of said core, thereby creating one longitudinal alignment of said curved end turns on each of a left and a right side of said core;
    inserting, at least partially, a serpentine tubing assembly in said core proximate a surface opposite a face passing by said longitudinal edges of said laminations; and
    inserting one lateral tube within each one of said two longitudinal alignments of said curved end turns so that said lateral tubes contact an inner surface of said curved end turns, said lateral tubes having an oblong cross-section.

15. The method of claim 14 further comprising vacuum pressure impregnating said two lateral tubes with their respective longitudinal alignment of said curved end turns.

16. The method of claim 14 further comprising retaining at least a portion of said serpentine tubing assembly in contact with said core using a plurality of wedges.

17. The method of claim 16 further comprising inserting a fiberglass layer between said serpentine tubing assembly and said core so as to electrically insulate said serpentine tubing assembly from said core.

18. The method of claim 17 further comprising vacuum impregnating said fiberglass layer with resin.

* * * * *